(12) United States Patent
Kerr

(10) Patent No.: X7739
(45) Date of Patent: Sep. 6, 1833

(54) PUMP, WIND

(76) Inventor: James Kerr

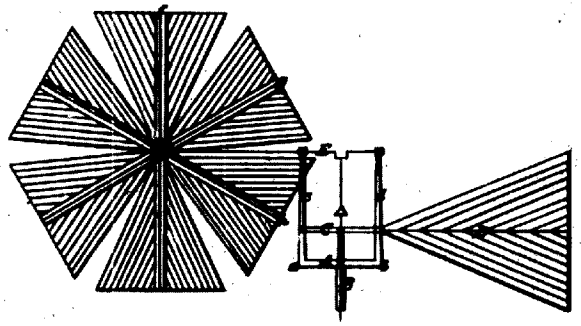

United States Patent
Patent No.: X7739
X7739
Wind Wheel.
Patented Sept. 6. 1833.